United States Patent
Zhang

(10) Patent No.: US 9,742,612 B2
(45) Date of Patent: Aug. 22, 2017

(54) METHOD AND DEVICE FOR TRANSMITTING DATA BY USING MULTIDIMENSIONAL CONSTELLATION DIAGRAM

(71) Applicant: HUAWEI TECHNOLOGIES CO., LTD., Shenzhen (CN)

(72) Inventor: Qizhi Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/972,610

(22) Filed: Dec. 17, 2015

(65) Prior Publication Data

US 2016/0112237 A1 Apr. 21, 2016

Related U.S. Application Data

(63) Continuation of application No. PCT/CN2013/077391, filed on Jun. 18, 2013.

(51) Int. Cl.
*H04L 5/12* (2006.01)
*H04L 27/34* (2006.01)
*H04L 27/36* (2006.01)

(52) U.S. Cl.
CPC .......... *H04L 27/3405* (2013.01); *H04L 27/36* (2013.01)

(58) Field of Classification Search
CPC ..... H04L 27/38; H04L 27/34; H04L 27/3488; H04L 1/0041; H04L 1/0071;
(Continued)

(56) References Cited

U.S. PATENT DOCUMENTS

| 2002/0080867 | A1 | 6/2002 | Abbas et al. | |
| 2009/0274243 | A1* | 11/2009 | Lee | H04L 1/0625 375/295 |
| 2014/0079162 | A1* | 3/2014 | Mansour | H04L 1/0054 375/341 |

FOREIGN PATENT DOCUMENTS

| CN | 1812310 A | 8/2006 |
| CN | 101582754 A | 11/2009 |
| CN | 102571670 A | 7/2012 |
| WO | 2008/026053 A2 | 3/2008 |

OTHER PUBLICATIONS

Haiyang et al., "Selection and Realization of 512QAM Constellation", Journal of Nanjing Institute of Posts and Telecommunications, vol. 18, No. 3, Jun. 1998, 4 pages.
(Continued)

*Primary Examiner* — Zewdu Kassa
(74) *Attorney, Agent, or Firm* — Staas & Halsey LLP

(57) ABSTRACT

Embodiments of the present invention relate to the field of communications, and provide a method and a device for transmitting data by using a multidimensional constellation diagram, which can further improve bit error rate-signal to noise ratio performance by means of a multidimensional constellation diagram. The method is: First, bit data is mapped, by using an n-dimensional constellation diagram, into a column vector including n real numbers, then the n real numbers included in the column vector are modulated by using a resource element and sent, and after demodulating the n real numbers from a received signal, a receiving device finds, in the n-dimensional constellation diagram, a constellation point with coordinate values having a closest Euclidean distance to a point with coordinates being the n real numbers, and finally maps the coordinate values of the constellation point back into the bit data.

12 Claims, 6 Drawing Sheets

---

S101 — Map, by using an n-dimensional constellation diagram, bit data into a column vector including n real numbers, where in the n-dimensional constellation diagram, there are at least n(n+1) minimum-distance constellation points around each non-boundary constellation point S102 — Modulate, by using a resource element, the n real numbers included in the column vector S103 — Send modulated data to a receiving device

(58) Field of Classification Search
CPC .............. H04L 27/2647; H04L 5/0007; H04L 27/2657; H04L 27/2662; H04L 5/0048; H04L 25/4902; H04L 1/0009; H04L 25/49; H04B 3/54
USPC .......................... 375/261, 259, 260, 316, 295
See application file for complete search history.

(56) References Cited

OTHER PUBLICATIONS

Wei, "Trellis-Coded Modulation with Multidimensional Constellations", IEEE Transactions on Information Theory, vol. 1t-33, No. 4, Jul. 1987, pp. 483-501.

Xingxin et al., "Asymmetric Hexagonal QAM Based OFDM System", Department of Electronics Engineering, Tsinghua University, 2002, Beijing, China, pp. 299-301.
International Search Report dated Mar. 20, 2014 in corresponding International Patent Application No. PCT/CN2013/077391.
Extended European Search Report dated Apr. 26, 2016 in corresponding European Patent Application No. 13887556.2.
International Search Report mailed Mar. 20, 2014, in corresponding International Application No. PCT/CN2013/077391.
Internet article titled "LTE Physical Layer Overview," by Keysight Technologies, Inc., © 2000-2016, retrieved from http://rfmw.em.keysight.com/wireless/helpfiles/89600B/WebHelp/Subsystems/lte/content/lte_overview.htm on Dec. 30, 2016. (14 pages).
LTE Resource Guide, by Anritsu, © 2009, available at web.cecs.pdx.edu/~fli/class/LTE_Reource_Guide.pdf. (18 pages).

* cited by examiner

METHOD AND DEVICE FOR TRANSMITTING DATA BY USING MULTIDIMENSIONAL CONSTELLATION DIAGRAM

CROSS-REFERENCE TO RELATED APPLICATIONS

This application is a continuation of International Application No. PCT/CN 2013/077391, filed on Jun. 18, 2013, which is hereby incorporated by reference in its entirety.

TECHNICAL FIELD

Embodiments of the present invention relate to the field of communications, and in particular, to a method and a device for transmitting data by using a multidimensional constellation diagram.

BACKGROUND

In the field of digital communications, digital signals are often represented on a complex plane to intuitively represent a relationship between signals, and such a graphic representation is a constellation diagram.

Most current communications systems use a square constellation diagram. This constellation diagram has advantages of being easily modulated and demodulated. However, for this constellation diagram, there is still improvement room for bit error rate and signal to noise ratio performance. Moreover, currently, time-frequency resources are increasingly cherished, electronic components have continuously lowered prices and continuously improved processing capabilities, and therefore it seems to be more cost-effective to exchange relatively complex modulation and demodulation processes for higher usage of time-frequency resources.

In the prior art, a hexagonal lattice constellation diagram is used. This lattice constellation diagram has a closer arrangement. Therefore, if quantities of points are the same and distances between points are also the same, this hexagonal lattice constellation diagram has less average energy than a quadrilateral constellation diagram does, thereby having better bit error rate and signal to noise ratio performance.

In a process of improving the foregoing constellation diagram, it is found that there is still improvement room for the prior art.

In the prior art, although bit error rate-signal to noise ratio performance is improved by means of an orthohexagonal constellation diagram, the constellation diagram can be further improved to further improve the bit error rate-signal to noise ratio performance.

SUMMARY

Embodiments of the present invention provide a method and a device for transmitting data by using a multidimensional constellation diagram, which further improve bit error rate-signal to noise ratio performance by means of a multidimensional constellation diagram.

According to a first aspect, a method for transmitting data by using a multidimensional constellation diagram is provided, where the method includes:

mapping, by using an n-dimensional constellation diagram, bit data into a column vector including n real numbers, where in the n-dimensional constellation diagram, there are at least $n(n+1)$ minimum-distance constellation points around each non-boundary constellation point;

modulating, by using a resource element, the n real numbers included in the column vector; and sending modulated data to a receiving device.

In a first possible implementation manner, with reference to the first aspect, the n-dimensional constellation diagram has constellation points $\alpha_0, \alpha_1, \alpha_2, \alpha_3, \ldots, \alpha_n$, where $\alpha_0 + \alpha_1 + \alpha_2 + \alpha_3 + \ldots + \alpha_n = 0$;

$\|\alpha_i\| = 1, i = 0,1,2,3, \ldots, n$;

any n of $\alpha_0, \alpha_1, \alpha_2, \alpha_3, \ldots, \alpha_n$ are linearly independent; and there is an orthogonal matrix K, so that $K\alpha_i = \alpha_{(i+1 \bmod n)}$, $i = 0,1,2,3, \ldots, n-1$, and $K^n = 1$.

In a second possible implementation manner, with reference to the first aspect or the first possible implementation manner of the first aspect, the modulating, by using a resource element, the n real numbers included in the column vector includes:

when n is an even number, modulating, by using n/2 resource elements, the n real numbers included in the column vector; or when n is an odd number, modulating, by using (n−1)/2 resource elements and a cosine component or a sinusoidal component of another resource element except the (n−1)/2 resource elements, the n real numbers included in the column vector.

According to a second aspect, a method for transmitting data by using a multidimensional constellation diagram is provided, where the method includes:

receiving modulated data sent by a sending device;

demodulating n real numbers from the modulated data;

finding, in an n-dimensional constellation diagram, a constellation point having a closest Euclidean distance to a point with coordinates being the demodulated n real numbers, where in the n-dimensional constellation diagram, there are at least $n(n+1)$ minimum-distance constellation points around each non-boundary constellation point; and mapping the found closest constellation point into a data bit.

In a first possible implementation manner, with reference to the second aspect, the n-dimensional constellation diagram has constellation points $\alpha_0, \alpha_1, \alpha_2, \alpha_3, \ldots, \alpha_n$, where $\alpha_0 + \alpha_1 + \alpha_2 + \alpha_3 + \ldots + \alpha_n = 0$;

$\|\alpha_i\| = 1, i = 0,1,2,3, \ldots, n$;

any n of $\alpha_0, \alpha_1, \alpha_2, \alpha_3, \ldots, \alpha_n$ are linearly independent; and there is an orthogonal matrix K, so that $K\alpha_i = \alpha_{(i+1 \bmod n)}$, $i = 0,1,2,3, \ldots, n-1$, and $K^n = 1$.

According to a third aspect, a sending device is provided, where the sending device includes:

a mapping module, configured to map, by using an n-dimensional constellation diagram, bit data into a column vector including n real numbers, where in the n-dimensional constellation diagram, there are at least $n(n+1)$ minimum-distance constellation points around each non-boundary constellation point;

a modulating module, configured to modulate, by using a resource element, the n real numbers included in the column vector; and a sending module, configured to send modulated data to a receiving device.

In a first possible implementation manner, with reference to the third aspect, the n-dimensional constellation diagram has constellation points $\alpha_0, \alpha_1, \alpha_2, \alpha_3, \ldots, \alpha_n$, where $\alpha_0 + \alpha_1 + \alpha_2 + \alpha_3 + \ldots + \alpha_n = 0$;

$\|\alpha_i\| = 1, i = 0,1,2,3, \ldots, n$;

any n of $\alpha_0, \alpha_1, \alpha_2, \alpha_3, \ldots, \alpha_n$ are linearly independent; and there is an orthogonal matrix K, so that $K\alpha_i=\alpha_{(i+1 \bmod n)}$, $i=0,1,2,3,\ldots,n-1$, and $K^n=1$.

In a second possible implementation manner, with reference to the third aspect or the first possible implementation manner of the third aspect, the modulating module is further configured to:

when n is an even number, modulate, by using n/2 resource elements, the n real numbers included in the column vector; or when n is an odd number, modulate, by using (n−1)/2 resource elements and a cosine component or a sinusoidal component of another resource element except the (n−1)/2 resource elements, the n real numbers included in the column vector.

According to a fourth aspect, a receiving device is provided, where the receiving device includes:

a receiving module, configured to receive a modulated signal sent by a sending device;

a demodulating module, configured to demodulate n real numbers from the modulated signal;

a search module, configured to find, in an n-dimensional constellation diagram, a constellation point having a closest Euclidean distance to a point with coordinates being the demodulated n real numbers, where in the n-dimensional constellation diagram, there are at least n(n+1) minimum-distance constellation points around each non-boundary constellation point; and a reverse-mapping module, configured to map the found closest constellation point into a data bit.

In a first possible implementation manner, with reference to the fourth aspect, the n-dimensional constellation diagram has constellation points $\alpha_0, \alpha_1, \alpha_2, \alpha_3, \ldots, \alpha_n$, where $\alpha_0+\alpha_1+\alpha_2+\alpha_3+\ldots+\alpha_n=0$;

$\|\alpha_i\|=1, i=0,1,2,3,\ldots,n$;

any n of $\alpha_0, \alpha_1, \alpha_2, \alpha_3, \ldots, \alpha_n$ are linearly independent; and there is an orthogonal matrix K, so that $K\alpha_i=\alpha_{(i+1 \bmod n)}$, $i=0, 1,2,3,\ldots,n-1$, and $K^n=1$.

According to a fifth aspect, a sending device is provided, where the sending device includes a bus, and a processor, a memory, and an interface that are connected to the bus, where the memory is configured to store an instruction, and the processor executes the instruction to:

map, by using an n-dimensional constellation diagram, bit data into a column vector including n real numbers, where in the n-dimensional constellation diagram, there are at least n(n+1) minimum-distance constellation points around each non-boundary constellation point;

modulate, by using a resource element, the n real numbers included in the column vector; and send modulated data through the interface.

In a first possible implementation manner, with reference to the fifth aspect, the n-dimensional constellation diagram has constellation points $\alpha_0, \alpha_1, \alpha_2, \alpha_3, \ldots, \alpha_n$, where $\alpha_0+\alpha_1+\alpha_2+\alpha_3+\ldots+\alpha_n=0$;

$\|\alpha_i\|=1, i=0,1,2,3,\ldots,n$;

any n of $\alpha_0, \alpha_1, \alpha_2, \alpha_3, \ldots, \alpha_n$ are linearly independent; and there is an orthogonal matrix K, so that $K\alpha_i=\alpha_{(i+1 \bmod n)}$, $i=0,1,2,3,\ldots,n-1$, and $K^n=1$.

In a second possible implementation manner, with reference to the fifth aspect or the first possible implementation manner of the fifth aspect, the processor executes the instruction to further:

when n is an even number, modulate, by using n/2 resource elements, the n real numbers included in the column vector; or when n is an odd number, modulate, by using (n−1)/2 resource elements and a cosine component or a sinusoidal component of another resource element except the (n−1)/2 resource elements, the n real numbers included in the column vector.

According to a sixth aspect, a receiving device is provided, where the receiving device includes a bus, and a processor, a memory, and an interface that are connected to the bus, where the memory is configured to store an instruction, and the processor executes the instruction to:

receive, through the interface, a modulated signal sent by a sending device;

demodulate n real numbers from the modulated signal;

find, in an n-dimensional constellation diagram, a constellation point having a closest Euclidean distance to a point with coordinates being the demodulated n real numbers, where in the n-dimensional constellation diagram, there are at least n(n+1) minimum-distance constellation points around each non-boundary constellation point; and map the found closest constellation point into a data bit.

In a first possible implementation manner, with reference to the sixth aspect, the n-dimensional constellation diagram has constellation points $\alpha_0, \alpha_1, \alpha_2, \alpha_3, \ldots, \alpha_n$, where $\alpha_0+\alpha_1+\alpha_2+\alpha_3+\ldots+\alpha_n=0$;

$\|\alpha_i\|=1, i=0,1,2,3,\ldots,n$;

any n of $\alpha_0, \alpha_1, \alpha_2, \alpha_3, \ldots, \alpha_n$ are linearly independent; and there is an orthogonal matrix K, so that $K\alpha_i=\alpha_{(i+1 \bmod n)}$, $i=0, 1,2,3,\ldots,n-1$, and $K^n=1$.

The embodiments of the present invention provide a method and a device for transmitting data by using a multidimensional constellation diagram. First, bit data is mapped, by using an n-dimensional constellation diagram, into a column vector including n real numbers, then the n real numbers included in the column vector are modulated by using a resource element and sent, and after demodulating the n real numbers from a received signal, a receiving device finds, in the n-dimensional constellation diagram, a constellation point having a closest Euclidean distance to a point with coordinates being the n real numbers, and finally maps coordinate values of the constellation point back into the bit data, thereby further improving bit error rate-signal to noise ratio performance by means of a multidimensional constellation diagram.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
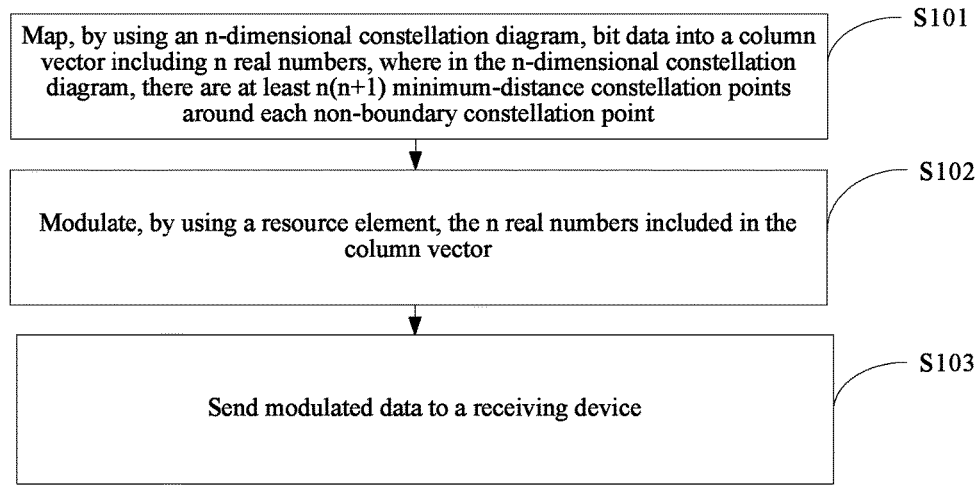
FIG. 1 is a first schematic flowchart of a method for transmitting data by using a multidimensional constellation diagram according to an embodiment of the present invention.

An embodiment of the present invention provides a method for transmitting data by using a multidimensional constellation diagram, based on a sending device side. As shown in FIG. 1, the method includes:

S101: Map, by using an n-dimensional constellation diagram, bit data into a column vector including n real numbers, where in the n-dimensional constellation diagram, there are at least n(n+1) minimum-distance constellation points around each non-boundary constellation point.

S102: Modulate, by using an resource element (RE), the n real numbers included in the column vector.

S103: Send modulated data to a receiving device.

Figure 2:
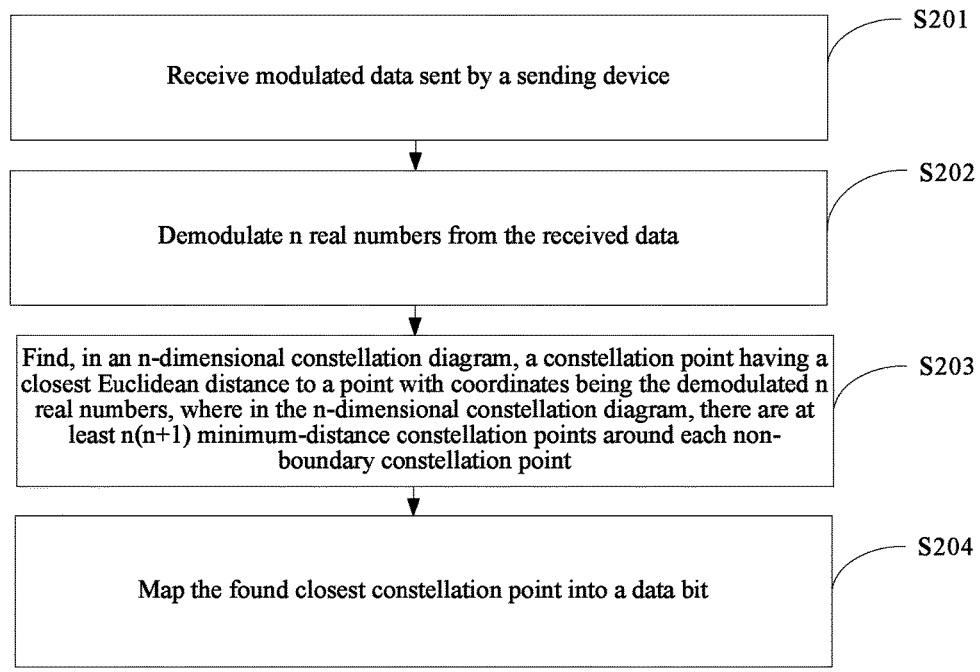
FIG. 2 is a second schematic flowchart of a method for transmitting data by using a multidimensional constellation diagram according to an embodiment of the present invention.

An embodiment of the present invention further provides another method for transmitting data by using a multidimensional constellation diagram, based on a receiving device side. As shown in FIG. 2, the method includes:

S201: Receive modulated data sent by a sending device.

S202: Demodulate n real numbers from the received data.

S203: Find, in an n-dimensional constellation diagram, a constellation point having a closest Euclidean distance to a point with coordinates being the demodulated n real numbers, where in the n-dimensional constellation diagram, there are at least n(n+1) minimum-distance constellation points around each non-boundary constellation point.

S204: Map the found closest constellation point into a data bit.

The embodiments of the present invention provide a method for transmitting data by using a multidimensional constellation diagram. First, bit data is mapped, by using an n-dimensional constellation diagram, into a column vector including n real numbers, then the n real numbers included in the column vector are modulated by using a resource element and sent, and after demodulating the n real numbers from a received signal, a receiving device finds, in the n-dimensional constellation diagram, a constellation point having a minimum Euclidean distance to a point with coordinates being the n real numbers, and finally maps coordinate values of the constellation point back into the bit data, thereby further improving bit error rate-signal to noise ratio performance by means of a multidimensional constellation diagram.

Figure 3:
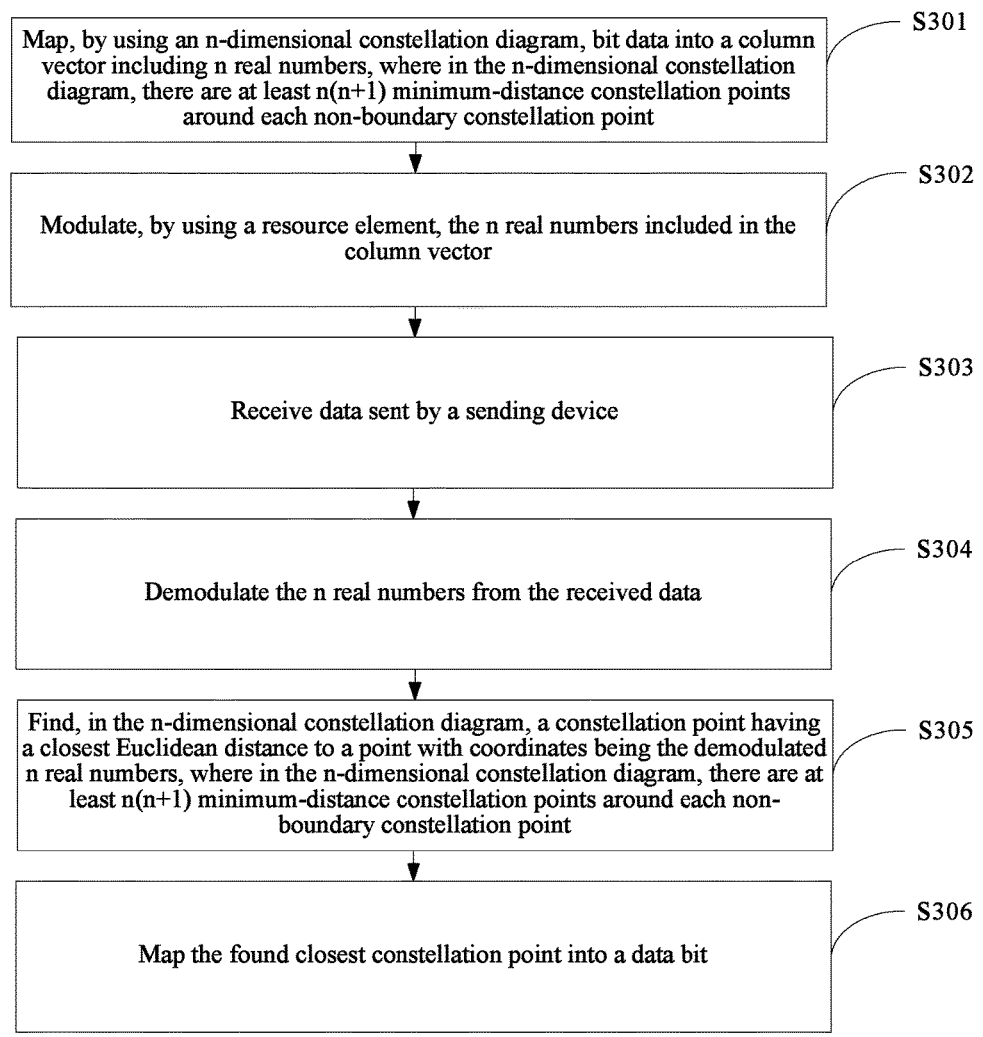
FIG. 3 is a third schematic flowchart of a method for transmitting data by using a multidimensional constellation diagram according to an embodiment of the present invention.

To make a person skilled in the art understand the technical solutions provided in the embodiments of the present invention more clearly, the following describes the method for transmitting data by using a multidimensional constellation diagram in the present invention in detail in combination with a specific embodiment. As shown in FIG. 3, the method includes:

S301: Map, by using an n-dimensional constellation diagram, bit data into a column vector including n real numbers, where in the n-dimensional constellation diagram, there are at least n(n+1) minimum-distance constellation points around each non-boundary constellation point.

Specifically, in the n-dimensional constellation diagram, there being the at least n(n+1) minimum-distance constellation points around each non-boundary constellation point may be implemented by using the following method:

mapping, according to a mapping relationship between a constellation point in the constellation diagram and bit data, the bit data into a column vector including several real numbers.

Figure 4:
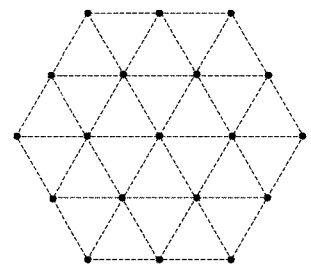
FIG. 4 is a schematic structural diagram of a hexagonal constellation diagram in the prior art according to an embodiment of the present invention.

Exemplarily, in an Orthogonal Frequency Division Multiplexing (OFDM) system, if each resource element (RE) uses a classical 64 quadrature amplitude modulation (QAM) constellation diagram, in an n-dimensional constellation diagram including transferable information, there are 2n minimum-distance points around each non-boundary point; or if each RE uses a 6-bit hexagonal constellation diagram, there are only 3n minimum-distance points around each non-boundary point, as shown in FIG. 4, where only two circles are drawn for a constellation diagram in FIG. 4, and a circle may be added at the periphery.

A constellation diagram needs to be found, where there are more minimum-distance points around each non-boundary point. First, a positive definite quadratic form of an integral coefficient about variables $a_1, a_2, \ldots, a_n$ needs to be considered:

$$f(a_1, a_2, \ldots a_n) = a_1^2 + a_2^2 + \ldots a_n^2 - \sum_{i=1}^{n-1} a_i a_{i+1} + \sum_{i=1}^{n-2} a_i a_{i+2} - \ldots + (-1)^{n-1} a_1 a_n.$$

It is easily verified that an equation $f(\alpha_1, \alpha_2, \ldots \alpha_n)=1$ has at least n(n+1) sets of integer solution, that is:

$\pm \grave{o}_i$, for $i=1, \ldots n$;

$\pm(\grave{o}_i - \grave{o}_{i+1})$ for $i=1, \ldots n-1$;

$\pm(\grave{o}_i + \grave{o}_{i+2})$ for $i=1, \ldots n-2$;

. . .

$\pm(\grave{o}_i + (-1)^{n-1} \grave{o}_n)$, where $\grave{o}_1, \ldots, \grave{o}_n$ are a column vector of an n-order unit square matrix $I_n$.

On the other hand, $$f(a_1, a_2, \ldots a_n) =$$

$$a_1^2 + a_2^2 + \ldots a_n^2 - \sum_{i=1}^{n-1} a_i a_{i+1} + \sum_{i=1}^{n-2} a_i a_{i+2} - \ldots + (-1)^{n-1} a_1 a_n =$$

$$(a_1, a_2, \ldots a_n) A \begin{pmatrix} a_1 \\ a_2 \\ \vdots \\ a_n \end{pmatrix},$$

where $A = B^T B$;

$$B = \begin{pmatrix} \sqrt{\frac{2}{2}} & 0 & 0 & 0 & 0 \\ 0 & \sqrt{\frac{3}{4}} & 0 & 0 & 0 \\ 0 & 0 & \sqrt{\frac{4}{6}} & 0 & 0 \\ 0 & 0 & 0 & \ddots & 0 \\ 0 & 0 & 0 & 0 & \sqrt{\frac{n+1}{2n}} \end{pmatrix} \begin{pmatrix} 1 & -\frac{1}{2} & \frac{1}{2} & \cdots & (-1)^{n-1}\frac{1}{2} \\ 0 & 1 & -\frac{1}{3} & \cdots & (-1)^{n-2}\frac{1}{3} \\ 0 & 0 & \ddots & \ddots & \vdots \\ 0 & 0 & 0 & \ddots & -\frac{1}{n} \\ 0 & 0 & 0 & 0 & 1 \end{pmatrix};$$

and a column vector of B is written as $e_1, e_2, \ldots, e_n$.

Assuming that $c_n = z_{e_1} + \ldots + z_{e_n} = \{\alpha_1 e_1 + \ldots + \alpha_n e_n \in R^{(n)}: \alpha_1, \ldots, \alpha_n \in Z\}$, for elements in $c_n$, $$\|a_1 e_1 + \ldots a_n e_n\|^2 = (a_1, \ldots a_n) B^T B \begin{pmatrix} a_1 \\ \vdots \\ a_n \end{pmatrix} = f(a_1, a_2, \ldots a_n).$$

Therefore, there are at least $n(n+1)$ points having a distance being 1 around a point 0 in $c_n$. It can be known from Z-linearity of $c_n$ that that there are at least $n(n+1)$ points having a distance being 1 around each point in $c_n$. A convex subset, including 0, of $c_n$ (the convex subset of $c_n$ refers to an intersection set of a convex subset of $R^{(n)}$ and $c_n$) may be used as a constellation diagram.

Assuming that n=4, the foregoing quadratic form is changed into:

$f(a,b,c,d) = a^2 + b^2 + c^2 + d^2 - ab - bc - cd - da + ac + bd$ an equation $f(a, b, c, d)=1$ has at least 20 integer solutions:

$$\pm \begin{pmatrix} 1 \\ 0 \\ 0 \\ 0 \end{pmatrix}, \pm \begin{pmatrix} 0 \\ 1 \\ 0 \\ 0 \end{pmatrix}, \pm \begin{pmatrix} 0 \\ 0 \\ 1 \\ 0 \end{pmatrix}, \pm \begin{pmatrix} 0 \\ 0 \\ 0 \\ 1 \end{pmatrix}, \pm \begin{pmatrix} 1 \\ 1 \\ 0 \\ 0 \end{pmatrix},$$

$$\pm \begin{pmatrix} 0 \\ 1 \\ 1 \\ 0 \end{pmatrix}, \pm \begin{pmatrix} 0 \\ 0 \\ 1 \\ 1 \end{pmatrix}, \pm \begin{pmatrix} 1 \\ 0 \\ 0 \\ 1 \end{pmatrix}, \pm \begin{pmatrix} 1 \\ 0 \\ -1 \\ 0 \end{pmatrix}, \pm \begin{pmatrix} 0 \\ 1 \\ 0 \\ -1 \end{pmatrix};$$

the foregoing square matrix A is changed into:

$$\begin{pmatrix} 1 & -\frac{1}{2} & \frac{1}{2} & -\frac{1}{2} \\ -\frac{1}{2} & 1 & -\frac{1}{2} & \frac{1}{2} \\ \frac{1}{2} & -\frac{1}{2} & 1 & -\frac{1}{2} \\ -\frac{1}{2} & \frac{1}{2} & -\frac{1}{2} & 1 \end{pmatrix};$$

B is changed into:

$$\begin{pmatrix} 1 & -\frac{1}{2} & \frac{1}{2} & -\frac{1}{2} \\ 0 & \frac{\sqrt{3}}{2} & -\frac{\sqrt{3}}{6} & \frac{\sqrt{3}}{6} \\ 0 & 0 & \frac{\sqrt{6}}{3} & -\frac{6}{12} \\ 0 & 0 & 0 & \frac{\sqrt{10}}{4} \end{pmatrix};$$

and the lattice point set $c_n$ (n=4) is changed into:

$$Z \begin{pmatrix} 1 \\ 0 \\ 0 \\ 0 \end{pmatrix} + Z \begin{pmatrix} -\frac{1}{2} \\ \frac{\sqrt{3}}{2} \\ 0 \\ 0 \end{pmatrix} + Z \begin{pmatrix} \frac{1}{2} \\ -\frac{\sqrt{3}}{6} \\ \frac{\sqrt{6}}{3} \\ 0 \end{pmatrix} + Z \begin{pmatrix} -\frac{1}{2} \\ \frac{\sqrt{3}}{6} \\ -\frac{\sqrt{6}}{2} \\ \frac{\sqrt{10}}{4} \end{pmatrix} \subset R^{(4)}.$$

Assuming that $$\alpha_0 = \begin{pmatrix} 1 \\ 0 \\ 0 \\ 0 \end{pmatrix}, \alpha_1 = \begin{pmatrix} -\frac{1}{2} \\ \frac{\sqrt{3}}{2} \\ 0 \\ 0 \end{pmatrix}, \alpha_2 = \begin{pmatrix} 0 \\ -\frac{\sqrt{3}}{3} \\ -\frac{\sqrt{6}}{3} \\ 0 \end{pmatrix}, \alpha_3 = \begin{pmatrix} 0 \\ 0 \\ \frac{\sqrt{6}}{4} \\ \frac{\sqrt{10}}{4} \end{pmatrix},$$

$$\alpha_4 = \begin{pmatrix} -\frac{1}{2} \\ -\frac{\sqrt{3}}{6} \\ \frac{\sqrt{6}}{12} \\ -\frac{\sqrt{10}}{4} \end{pmatrix},$$

it is easily verified that
1. $\alpha_i \in C_4$, where i=0, 1, . . . , 4;
2. $\Sigma_{i=0}^{4} \alpha_i = 0$;
3. any four of the five vectors are linearly independent; and
4. $\|\alpha_i\|=1$, i=0,1,2,3,4.

For r being a positive integer or $\infty$, it is assumed that $R(r):=\{1,2,\ldots,r\}$. For any proper subset S of $\{0,1,2,3,4\}$ it is assumed that $$U_s(r) = \sum_{i \in S} R(r)\alpha_i,$$

where $S \neq \emptyset$ and $U_\emptyset(r) = \{(0,0,0,0)^T\}$.

It can be proved that: $C_4 = U_S(r) \cap U_T(r) = \emptyset$, where $S \neq T$ and $$C_4 = \bigcup_{|S| \leq 4} U_S(\infty).$$

Assuming that $$K := \begin{pmatrix} -\frac{1}{2} & -\frac{\sqrt{3}}{6} & \frac{\sqrt{6}}{12} & -\frac{\sqrt{10}}{4} \\ \frac{\sqrt{3}}{2} & -\frac{1}{6} & \frac{\sqrt{2}}{12} & -\frac{\sqrt{30}}{12} \\ 0 & -\frac{2\sqrt{2}}{3} & -\frac{1}{12} & \frac{\sqrt{60}}{24} \\ 0 & 0 & \frac{-\sqrt{60}}{8} & -\frac{1}{4} \end{pmatrix},$$

it is easily proved that:

5. K is an orthogonal square matrix;
6. $K^5 = 1$; and
7. $K\alpha_i = \alpha_{(i+1 \bmod 5)}$, where $i \in \{0, 1, \ldots 4\}$.

It can be known from the foregoing property 7 that for each proper subset S of $\{0, 1, \ldots 4\}$, there is a property 8:

$KU_S = U_{S+1}$, where $S+1 := \{i+1 \bmod 5; i \in S\}$.

For $r, p \in Z_{\geq 0} \cup \{\infty\}$, assuming that $$C_4(r, p) = \left\{ x \in \bigcup_{|S| \leq 4} U_S(r) : \|x\|^2 \leq q \right\},$$

a point quantity list of $C_4(r, p)$ is shown in Table 1:

TABLE 1

| r | p | |
|---|---|---|
|   | 21 | 22 |
| 4 | 1941 | 1981 |
| 5 | 3321 | 3461 |
| 6 | 3941 | 4241 |
| 7 | 4001 | 4361 |
| ∞ | 4001 | 4361 |

It can be seen that, $C_4(\infty, 21)$ has 4001 points, and a 12-bit constellation diagram is made by adding 95 more points with energy being 22, where the 12-bit constellation diagram has 4096 points.

It is noted that $C_4(5,22) \setminus C_4(5,21)$ has 140 points, and 95 points are taken out from the 140 points and added to the constellation diagram. Actually, $(C_4(5,22) \setminus C_4(5,21)) \cap U_{\{0,1,2,3\}}$ has 18 points, that is:

$$(\beta_1, \beta_2, \ldots \beta_{18}) = (\alpha_0, \alpha_1, \alpha_2, \alpha_3) \begin{pmatrix} 1 & 1 & 1 & 3 & 3 & 3 & 3 & 4 & 4 & 4 & 4 & 5 & 5 & 5 & 5 & 5 & 5 & 5 \\ 2 & 4 & 5 & 2 & 2 & 3 & 4 & 1 & 1 & 3 & 5 & 1 & 2 & 2 & 4 & 4 & 4 & 5 \\ 1 & 1 & 4 & 2 & 5 & 2 & 1 & 4 & 4 & 4 & 4 & 2 & 2 & 3 & 3 & 5 & 5 & 2 \\ 5 & 4 & 5 & 5 & 5 & 5 & 4 & 1 & 3 & 5 & 5 & 1 & 3 & 3 & 4 & 1 & 4 & 3 \end{pmatrix}.$$

They form 90 points under the action of $\langle K \rangle$, and $\langle K \rangle := \{1, K, K^2, K^3, K^4\}$ is a 5-order multiplication cyclic group generated by K, that is, $\{K^i \beta_j : i=0,1, \ldots 4, j=1,2,\ldots 18\}$, and the 90 points are added to the constellation diagram.

$(C_4(5,22) \setminus C_4(5,21)) \cap U_{\{0,1,2\}}$ has two points, that is, $$(\gamma_1, \gamma_2) = (\alpha_0, \alpha_1, \alpha_2) \begin{pmatrix} 3 & 5 \\ 2 & 2 \\ 5 & 3 \end{pmatrix}.$$

A point $\gamma_1$ is taken, and the point forms 5 points under the action of $\langle K \rangle$, that is, $\{K^i \gamma_1 : i=0,1, \ldots 4\}$. The 5 points are also added to the constellation diagram, and then the 12-bit constellation diagram is obtained:

$\tilde{C}_4(\infty, 21) = C_4(\infty, 21) \cup \{K^i \beta_j : i=0,1, \ldots 4, j=1,2, \ldots 18\} \cup \{K^i \gamma_1 : i=0,1, \ldots 4\}$.

For ease of understanding a mapping manner of a code word in the following step, a structure of $C_4(\infty, 21) = C_4(7, 21)$ is analyzed herein.

It can be known from the foregoing property 8 that:

$\langle K \rangle$ is faithful to a transfer action on $\{U_S : |S| = 1\}$;
$\langle K \rangle$ is faithful to a transfer action on $\{U_S : |S| = 2\}$ to form two orbits, that is, an orbit on which $U_{\{0,1\}}(21)$ is located and an orbit on which $U_{\{0,2\}}(21)$ is located;
$\langle K \rangle$ is faithful to a transfer action on $\{U_S : |S| = 3\}$ to form two orbits, that is, an orbit on which $U_{\{0,1,2\}}(21)$ is located and an orbit on which $U_{\{0,1,3\}}$ is located; and
$\langle K \rangle$ is faithful to a transfer action on $\{U_S : |S| = 4\}$.

It should be explained that it is assumed that a group G acts on a set S, for an element x in S, $\{gx \in S : g \in G\}$ is referred to as an orbit generated by x under the action of G or an orbit on which x is located; if all elements in S use a same orbit, the action of G on S is transitive; and if for any $x, y \in S$, there is at most one $g \in G$ that makes $gx = y$, the action of G on S is faithful.

Therefore, point quantities in $U_S \cap C_4(7, 21)$ are all equal to point quantities of sets in Table 2.

TABLE 2

| Set | Point quantity |
|---|---|
| $U_\phi$ | 1 |
| $U_{\{0\}} \cap C_4(7,21)$ | 4 |
| $U_{\{0,1\}} \cap C_4(7,21)$ | 24 |
| $U_{\{0,2\}} \cap C_4(7,21)$ | 13 |
| $U_{\{0,1,2\}} \cap C_4(7,21)$ | 116 |
| $U_{\{0,1,3\}} \cap C_4(7,21)$ | 51 |
| $U_{\{0,1,2,3\}} \cap C_4(7,21)$ | 592 |

If 12-bit information needs to be transmitted by using the foregoing constellation diagram, the 12-bit information first needs to be mapped into a column vector including four real numbers, and a constellation mapping f is defined as follows:

f(0) = 0;
f({1,2,3,4}) = $U_{\{0\}} \cap C_4(7,21)$ $f(\{5, \ldots, 28\}) = U_{\{0,1\}} \cap C_4(7,21);$
$f(\{29, \ldots, 41\}) = U_{\{0,2\}} \cap C_4(7,21);$
$f(\{42, \ldots, 157\}) = U_{\{0,1,2\}} \cap C_4(7,21);$
$f(\{158, \ldots, 208\}) = U_{\{0,1,3\}} \cap C_4(7,21);$
$f(\{209, \ldots 800\}) = U_{\{0,1,2,3\}} \cap C_4(7,21);$
$f(801) = \gamma_1, (f(802), \ldots, f(819)) = (\beta_1 \ldots \beta_{18});$ and
$f(n) = K \Box f(n-819), n \geq 820.$ If elements in $U_S(7,21)$ are arranged in an alphabet order of front coefficients of $\alpha_0, \alpha_1, \alpha_2, \alpha_3$ under a condition of $p \leq 21$. For example, elements in $U_{\{0,1,2,3\}}(7,21)$ are arranged as follows:

$\alpha_0 + \alpha_1 + \alpha_2 + \alpha_3, \alpha_0 + \alpha_1 + \alpha_2 + 2\alpha_3, \ldots$ S302: Modulate, by using a resource element, the n real numbers included in the column vector.

Specifically, it may be implemented by using the following method:

when n is an even number, modulating, by using n/2 resource elements, the n real numbers included in the column vector, where each resource element modulates two real numbers; and for an RE having a carrier frequency being f, a time interval being [a, b], and a cyclic prefix time interval being [a, c] (a<c<b), and to-be-modulated real numbers x and y, a waveform after modulation is $x \cos 2\pi f(t-c) + y \sin 2\pi f(t-c)$ (t∈[a, b]); or when n is an odd number, modulating, by using (n−1)/2 resource elements and a cosine component or a sinusoidal component of another resource element except the (n−1)/2 resource elements, the n real numbers included in the column vector, where each resource element in the first (n−1)/2 resource elements modulates two real numbers; for a resource element having a carrier frequency being f, a time interval being [a, b], and a cyclic prefix time interval being [a, c] (a<c<b), and to-be-modulated real numbers x and y, a waveform after modulation is $x \cos 2\pi f(t-c) + y \sin 2\pi f(t-c)$ (t∈[a, b]); and if another resource element has a carrier frequency being f, a time interval being [a, b], and a cyclic prefix time interval being [a, c] (a<c<b), and a to-be-modulated real number is x, a waveform after modulation is $x \cos 2\pi f(t-c)$ (t∈[a, b]) (a cosine component is used) or $y \sin 2\pi f(t-c)$ (t∈[a, b]) (a sinusoidal component is used).

S303: Receive data sent by a sending device.

S304: Demodulate the n real numbers from the received data.

S305: Find, in the n-dimensional constellation diagram, a constellation point having a closest Euclidean distance to a point with coordinates being the demodulated n real numbers, where in the n-dimensional constellation diagram, there are at least n(n+1) minimum-distance constellation points around each non-boundary constellation point.

Exemplarily, in a process of transferring the foregoing 12-bit information data, after four real numbers are demodulated from a received signal, the demodulated four real numbers are used as coordinates, and in the constellation diagram, a maximum likelihood determination method is used to find, in the constellation diagram, a constellation point with coordinates having a closest Euclidean distance to a point with coordinates being the demodulated four real numbers.

S306: Map the found closest constellation point into a data bit.

Exemplarily, after the foregoing constellation point with the coordinates closest to the point with the coordinates being the demodulated four real numbers is found by using the maximum likelihood determination method, a mapping relationship of the constellation mapping f is used to map coordinate values of the obtained constellation point back into the 12-bit data.

Figure 5:
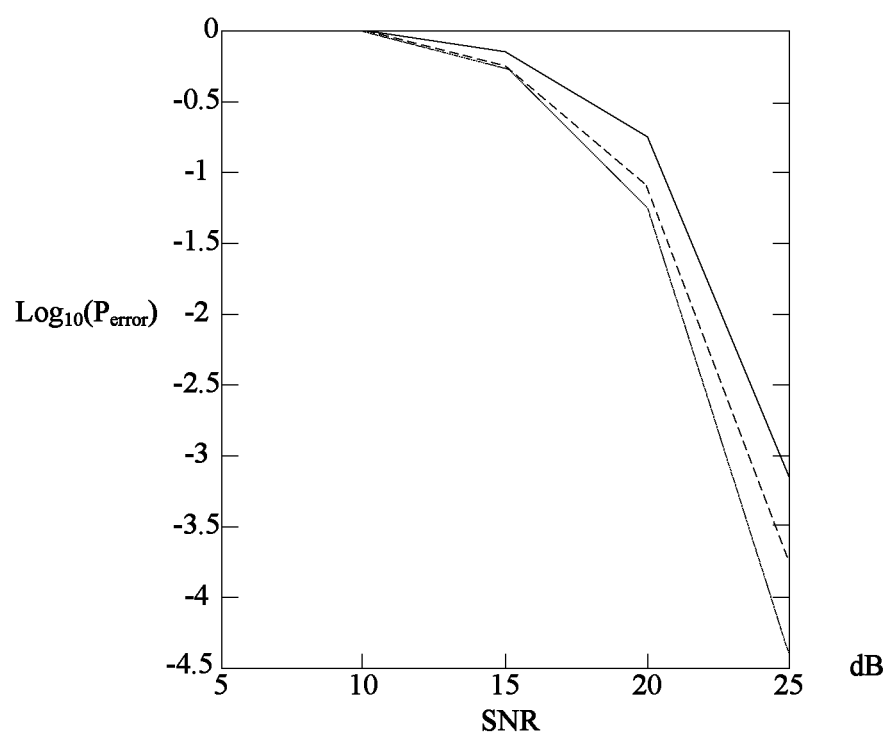
FIG. 5 is a schematic diagram of bit error rate-signal to noise ratio performance according to an embodiment of the present invention.

In this embodiment of the present invention, in the used constellation diagram, each non-boundary point has at least n(n+1) minimum-distance points. Compared with an existing hexagonal constellation diagram, each non-boundary point has more minimum-distance points, so that better bit error rate-signal to noise ratio performance is achieved when the foregoing 12-bit constellation diagram is used. As shown in FIG. 5, a solid line is performance when two REs separately use a classical 64 QAM constellation diagram; a dashed line in the middle is performance when two REs separately use a 6-bit hexagonal constellation diagram; and a dotted line downmost is performance when two REs jointly use the foregoing 12-bit constellation diagram $\overset{\Box}{C}_4(\infty, 21)$ This embodiment of the present invention provides a method for transmitting data by using a multidimensional constellation diagram. First, bit data is mapped, by using an n-dimensional constellation diagram, into a column vector including n real numbers, then the n real numbers included in the column vector are modulated by using a resource element and sent, and after demodulating the n real numbers from a received signal, a receiving device finds, in the n-dimensional constellation diagram, a constellation point having a closest Euclidean distance to a point with coordinates being the n real numbers, and finally maps coordinate values of the constellation point back into the bit data, thereby further improving bit error rate-signal to noise ratio performance by means of a multidimensional constellation diagram.

Figure 6:
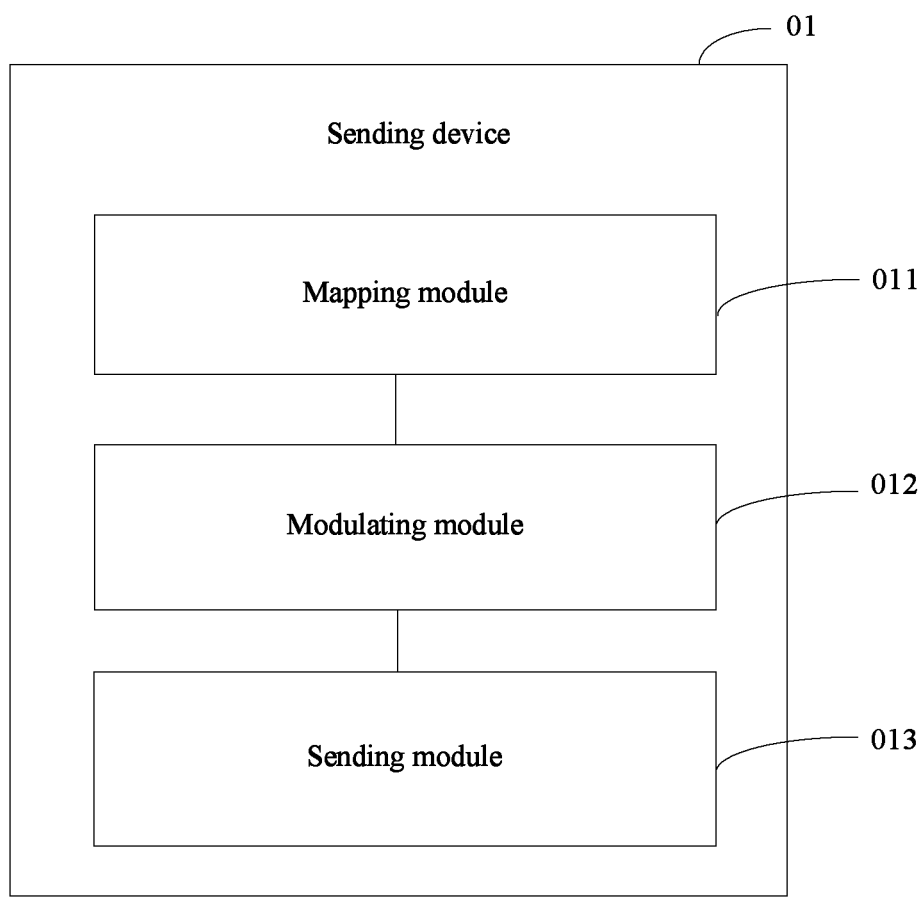
FIG. 6 is a first schematic structural diagram of a sending device according to an embodiment of the present invention.

An embodiment of the present invention provides a sending device 01 for transmitting data by using a multidimensional constellation diagram. As shown in FIG. 6, the sending device 01 includes:

a mapping module 011, configured to map, by using an n-dimensional constellation diagram, bit data into a column vector including n real numbers, where in the n-dimensional constellation diagram, there are at least n(n+1) minimum-distance constellation points around each non-boundary constellation point;

a modulating module 012, configured to modulate, by using a resource element, the n real numbers included in the column vector; and a sending module 013, configured to send modulated data to a receiving device.

Preferably, the n-dimensional constellation diagram has constellation points $\alpha_0, \alpha_1, \alpha_2, \alpha_3, \ldots, \alpha_n$, where $\alpha_0 + \alpha_1 + \alpha_2 + \alpha_3 + \ldots + \alpha_n = 0;$
$\|\alpha_i\| = 1, i = 0, 1, 2, 3, \ldots, n;$ any n of $\alpha_0, \alpha_1, \alpha_2, \alpha_3, \ldots, \alpha_n$ are linearly independent; and there is an orthogonal matrix K, so that $K\alpha_i = \alpha_{(i+1 \bmod n)}$, i=0, 1,2,3, . . . ,n−1, and $K^n = 1$.

Further, the modulating module 012 is specifically configured to:

when n is an even number, modulate, by using n/2 resource elements, the n real numbers included in the column vector; or when n is an odd number, modulate, by using (n−1)/2 resource elements and a cosine component or a sinusoidal component of another resource element except the (n−1)/2 resource elements, the n real numbers included in the column vector.

This embodiment of the present invention provides a sending device for transmitting data by using a multidimensional constellation diagram. First, bit data is mapped, by using an n-dimensional constellation diagram, into a column vector including n real numbers, and then the n real numbers included in the column vector are modulated by using a resource element and sent, so that after demodulating the n real numbers from a received signal, a receiving device finds, in the n-dimensional constellation diagram, a constellation point with coordinate values having a closest Euclidean distance to a point with coordinates being the n real numbers, and maps the coordinate values of the constellation point back into the bit data, thereby further improving bit error rate-signal to noise ratio performance by means of a multidimensional constellation diagram.

Figure 7:
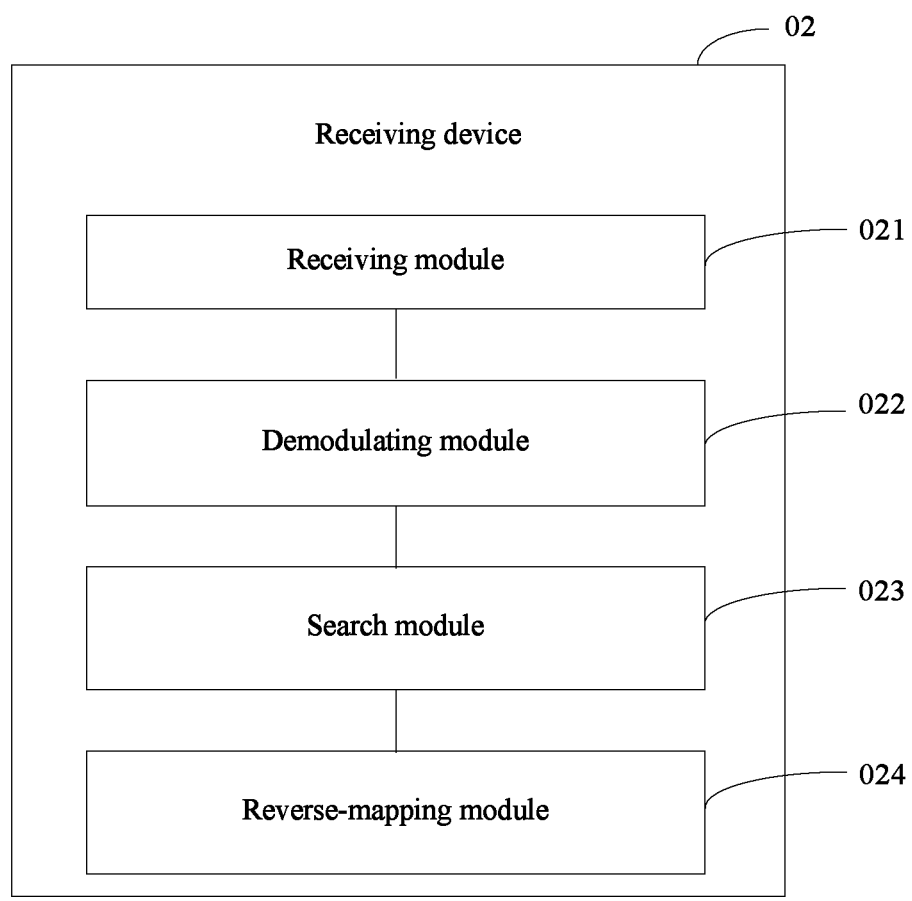
FIG. 7 is a first schematic structural diagram of a receiving device according to an embodiment of the present invention.

An embodiment of the present invention provides a receiving device 02 for transmitting data by using a multidimensional constellation diagram. As shown in FIG. 7, the receiving device 02 includes:

a receiving module 021, configured to receive a modulated signal sent by a sending device;

a demodulating module 022, configured to demodulate n real numbers from the modulated signal;

a search module 023, configured to find, in an n-dimensional constellation diagram, a constellation point having a closest distance to a constellation point with coordinates being the demodulated n real numbers, where in the n-dimensional constellation diagram, there are at least n(n+1) minimum-distance constellation points around each non-boundary constellation point; and a reverse-mapping module 024, configured to map the found closest constellation point into a data bit.

Preferably, the n-dimensional constellation diagram has constellation points $\alpha_0, \alpha_1, \alpha_2, \alpha_3, \ldots, \alpha_n$, where $\alpha_0+\alpha_1+\alpha_2+\alpha_3+ \ldots +\alpha_n=0$;

$\|\alpha_i\|=1, i=0,1,2,3, \ldots, n$;

any n of $\alpha_0, \alpha_1, \alpha_2, \alpha_3, \ldots, \alpha_n$ are linearly independent; and there is an orthogonal matrix K, so that $K\alpha_i=\alpha_{(i+1 \bmod n)}$, $i=0,1,2,3, \ldots, n-1$, and $K^n=1$.

This embodiment of the present invention provides a receiving device for transmitting data by using a multidimensional constellation diagram. After bit data is mapped, by using an n-dimensional constellation diagram, into a column vector including n real numbers, and the n real numbers included in the column vector are modulated by using a resource element and sent, after demodulating the n real numbers from a received signal, the receiving device finds, in the n-dimensional constellation diagram, a constellation point with coordinate values having a closest Euclidean distance to a point with coordinates being the n real numbers, and finally maps the coordinate values of the constellation point back into the bit data, thereby further improving bit error rate-signal to noise ratio performance by means of a multidimensional constellation diagram.

Figure 8:
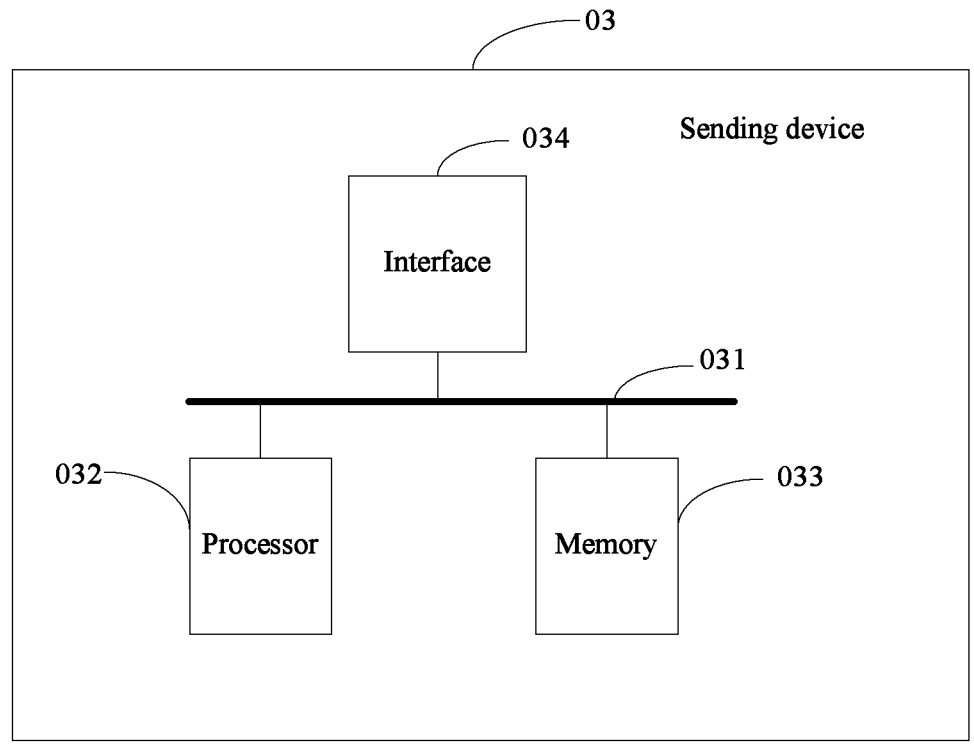
FIG. 8 is a second schematic structural diagram of a sending device according to an embodiment of the present invention.

An embodiment of the present invention provides a sending device 03 for transmitting data by using a multidimensional constellation diagram. As shown in FIG. 8, the sending device 03 includes a bus 031, and a processor 032, a memory 033, and an interface 034 that are connected to the bus 031, where the memory 033 is configured to store an instruction, and the processor 032 executes the instruction to:

map, by using an n-dimensional constellation diagram, bit data into a column vector including n real numbers, where in the n-dimensional constellation diagram, there are at least n(n+1) minimum-distance constellation points around each non-boundary constellation point;

modulate, by using a resource element, the n real numbers included in the column vector; and send modulated data through the interface 034.

Preferably, the n-dimensional constellation diagram has constellation points $\alpha_0, \alpha_1, \alpha_2, \alpha_3, \ldots, \alpha_n$, where $\alpha_0+\alpha_1+\alpha_2+\alpha_3+ \ldots +\alpha_n=0$;

$\|\alpha_i\|=1, i=0,1,2,3, \ldots, n$;

any n of $\alpha_0, \alpha_1, \alpha_2, \alpha_3, \ldots, \alpha_n$ are linearly independent; and there is an orthogonal matrix K, so that $K\alpha_i=\alpha_{(i+1 \bmod n)}$, $i=0,1,2,3, \ldots, n-1$, and $K^n=1$.

Further, the processor 032 executes the instruction to specifically:

when n is an even number, modulate, by using n/2 resource elements, the n real numbers included in the column vector; or when n is an odd number, modulate, by using (n−1)/2 resource elements and a cosine component or a sinusoidal component of another resource element except the (n−1)/2 resource elements, the n real numbers included in the column vector.

This embodiment of the present invention provides a sending device for transmitting data by using a multidimensional constellation diagram. First, bit data is mapped, by using an n-dimensional constellation diagram, into a column vector including n real numbers, and then the n real numbers included in the column vector are modulated by using a resource element and sent, so that after demodulating the n real numbers from a received signal, a receiving device finds, in the n-dimensional constellation diagram, a constellation point with coordinate values having a closest Euclidean distance to a point with coordinates being the n real numbers, and maps the coordinate values of the constellation point back into the bit data, thereby further improving bit error rate-signal to noise ratio performance by means of a multidimensional constellation diagram.

Figure 9:
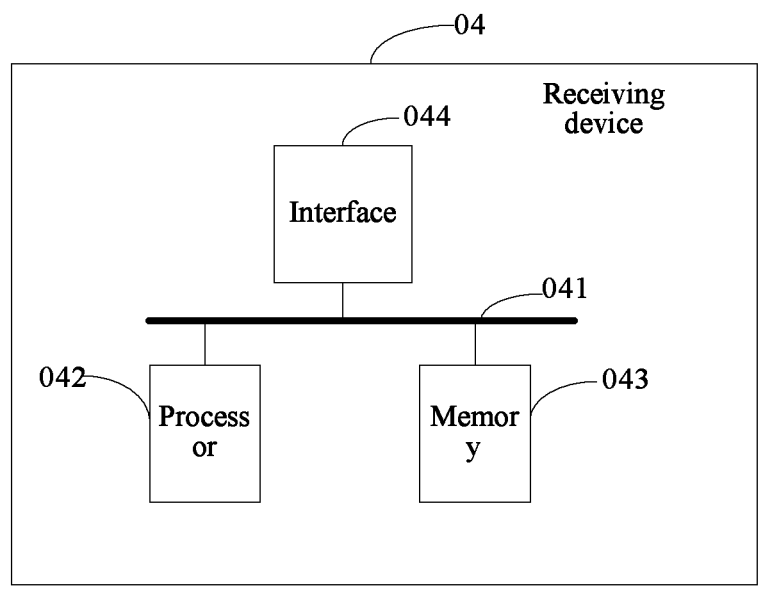
FIG. 9 is a second schematic structural diagram of a receiving device according to an embodiment of the present invention.

An embodiment of the present invention provides a receiving device 04 for transmitting data by using a multidimensional constellation diagram. As shown in FIG. 9, the receiving device 04 includes a bus 041, and a processor 042, a memory 043, and an interface 044 that are connected to the bus 041, where the memory 043 is configured to store an instruction, and the processor 042 executes the instruction to:

receive, through the interface 044, a modulated signal sent by a sending device;

demodulate n real numbers from the modulated signal;

find, in an n-dimensional constellation diagram, a constellation point having a closest Euclidean distance to a point with coordinates being the demodulated n real numbers, where in the n-dimensional constellation diagram, there are at least n(n+1) minimum-distance constellation points around each non-boundary constellation point; and map the found closest constellation point into a data bit.

Preferably, the n-dimensional constellation diagram has constellation points $\alpha_0, \alpha_1, \alpha_2, \alpha_3, \ldots, \alpha_n$, where $\alpha_0+\alpha_1+\alpha_2+\alpha_3+ \ldots +\alpha_n=0$;

$\|\alpha_i\|=1, i=0,1,2,3, \ldots, n$;

any n of $\alpha_0, \alpha_1, \alpha_2, \alpha_3, \ldots, \alpha_n$ are linearly independent; and there is an orthogonal matrix K, so that $K\alpha_i=\alpha_{(i+1 \bmod n)}$, $i=0,1,2,3, \ldots, n-1$, and $K^n=1$.

This embodiment of the present invention provides a receiving device for transmitting data by using a multidimensional constellation diagram. After bit data is mapped, by using an n-dimensional constellation diagram, into a column vector including n real numbers, and the n real numbers included in the column vector are modulated by using a resource element and sent, after demodulating the n real numbers from a received signal, the receiving device finds, in the n-dimensional constellation diagram, a constellation point with coordinate values having a closest Euclidean distance to a point with coordinates being the n real numbers, and finally maps the coordinate values of the constellation point back into the bit data, thereby further improving bit error rate-signal to noise ratio performance by means of a multidimensional constellation diagram.

In the several embodiments provided in the present application, it should be understood that the disclosed method and device may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in an electronic form, a mechanical form, or another form.

The units described as separate parts may or may not be physically separate, and parts displayed as units may or may not be physical units, that is, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of hardware in addition to a software functional unit.

The foregoing integrated unit that is implemented in a form of a software functional unit may be stored in a computer-readable storage medium. The foregoing software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting data by using a multidimensional constellation diagram, comprising:
    mapping, by using an n-dimensional constellation diagram, bit data into a column vector comprising n real numbers, wherein in the n-dimensional constellation diagram, there are at least n(n+1) minimum-distance constellation points around each non-boundary constellation point;
    modulating, by using at least one resource element, the n real numbers comprised in the column vector; and
    sending modulated data to a receiving device,
    wherein n is an integer greater than 2.

2. The method according to claim 1, wherein
    the n-dimensional constellation diagram has constellation points $\alpha_0, \alpha_1, \alpha_2, \alpha_3, \ldots, \alpha_n$, wherein
    $\alpha_0 + \alpha_1 + \alpha_2 + \alpha_3 + \ldots + \alpha_n = 0$;
    $\|\alpha_i\| = 1, i = 0, 1, 2, 3, \ldots, n$;
    any n of $\alpha_0, \alpha_1, \alpha_2, \alpha_3, \ldots, \alpha_n$ are linearly independent; and
    there is an orthogonal matrix K, so that $K\alpha_i = \alpha_{(i+1 \bmod n)}$, $i = 0, 1, 2, 3, \ldots, n-1$, and $K^n = 1$.

3. The method according to claim 1, wherein the modulating comprises:
    when n is an even number, modulating, by using n/2 resource elements, the n real numbers comprised in the column vector; or
    when n is an odd number, modulating, by using (n−1)/2 resource elements and a cosine component or a sinusoidal component of another resource element except the (n−1)/2 resource elements, the n real numbers comprised in the column vector.

4. The method according to claim 1, wherein n is equal to 4, and the 4-dimensional constellation diagram comprises 12-bits of information such that there are at least 4096 constellation points.

5. The method according to claim 1, wherein
    the modulating comprises using a plurality of resource elements,
    when n is an even number, the modulating further comprises:
        each resource element among the plurality of resource elements modulating two real numbers, and
        a number of the plurality of resource elements used for the modulating corresponds to n/2, and
    when n is an odd number, the modulating further comprises:
        each of a first number of resource elements among the plurality of resource elements modulating two real numbers, the first number of resource elements corresponding to (n−1)/2 resource elements, and
        a second number of resource elements modulating the n real numbers comprised in the column vector by using a cosine component or a sinusoidal component of the second number of resource elements, the second number of resource elements corresponding to the plurality of resource elements less the (n−1)/2 resource elements.

6. A method for transmitting data by using a multidimensional constellation diagram, wherein the method comprises:
    receiving modulated data sent by a sending device;
    demodulating n real numbers from the modulated data;
    finding, in an n-dimensional constellation diagram, a constellation point having a closest Euclidean distance to a point with coordinates being the demodulated n real numbers, wherein in the n-dimensional constellation diagram, there are at least n(n+1) minimum-distance constellation points around each non-boundary constellation point; and
    mapping the found closest constellation point into a data bit,
    wherein n is an integer greater than 2.

7. The method according to claim 6, wherein
the n-dimensional constellation diagram has constellation point $\alpha_0, \alpha_1, \alpha_2, \alpha_3, \ldots, \alpha_n$, wherein
$\alpha_0+\alpha_1+\alpha_2+\alpha_3+ \ldots +\alpha_n=0$;
$\|\alpha_i\|=1, i=0,1,2,3, \ldots, n$;
any n of $\alpha_0, \alpha_1, \alpha_2, \alpha_3, \ldots, \alpha_n$ are linearly independent; and
there is an orthogonal matrix K, so that $K\alpha_i=\alpha_{(i+1 mod n)}$, i=0,1,2,3, . . . ,n−1, and $K^n=1$.

8. A sending device, comprising a bus, and a processor, a memory, and an interface that are connected to the bus, wherein the memory is configured to store an instruction, and the processor executes the instruction to:
map, by using an n-dimensional constellation diagram, bit data into a column vector comprising n real numbers, wherein in the n-dimensional constellation diagram, there are at least n(n+1) minimum-distance constellation points around each non-boundary constellation point;
modulate, by using at least one resource element, the n real numbers comprised in the column vector; and
send modulated data through the interface,
wherein n is an integer greater than 2.

9. The sending device according to claim 8, wherein
the n-dimensional constellation diagram has constellation points $\alpha_0, \alpha_1, \alpha_2, \alpha_3, \ldots, \alpha_n$, wherein
$\alpha_0+\alpha_1+\alpha_2+\alpha_3+ \ldots +\alpha_n=0$;
$\|\alpha_i\|=1, i=0,1,2,3, \ldots, n$;
any n of $\alpha_0, \alpha_1, \alpha_2, \alpha_3, \ldots, \alpha_n$ are linearly independent; and
there is an orthogonal matrix K, so that $K\alpha_i=\alpha_{(i+1 mod n)}$, i=0,1,2,3, . . . ,n−1, and $K^n=1$.

10. The sending device according to claim 8, wherein
when n is an even number, the processor executes the instruction to modulate, by using n/2 resource elements, the n real numbers comprised in the column vector; or
when n is an odd number, the processor executes the instruction to modulate, by using (n−1)/2 resource elements and a cosine component or a sinusoidal component of another resource element except the (n−1)/2 resource elements, the n real numbers comprised in the column vector.

11. A receiving device, comprising:
a bus, and
a processor, a memory, and an interface connected to the bus, wherein the memory is configured to store an instruction, and the processor executes the instruction to:
receive, through the interface, a modulated signal sent by a sending device;
demodulate n real numbers from the modulated signal;
find, in an n-dimensional constellation diagram, a constellation point having a closest Euclidean distance to a point with coordinates being the demodulated n real numbers, wherein in the n-dimensional constellation diagram, there are at least n(n+1) minimum-distance constellation points around each non-boundary constellation point; and
map the found closest constellation point into a data bit,
wherein n is an integer greater than 2.

12. The receiving device according to claim 11, wherein
the n-dimensional constellation diagram has constellation points $\alpha_0, \alpha_1, \alpha_2, \alpha_3, \ldots, \alpha_n$, wherein
$\alpha_0+\alpha_1+\alpha_2+\alpha_3+ \ldots +\alpha_n=0$;
$\|\alpha_i\|=1, i=0,1,2,3, \ldots, n$;
any n of $\alpha_0, \alpha_1, \alpha_2, \alpha_3, \ldots, \alpha_n$ are linearly independent; and
there is an orthogonal matrix K, so that $K\alpha_i=\alpha_{(i+1 mod n)}$, i=0,1,2,3, . . . ,n−1, and $K^n=1$.

* * * * *